US009019481B2

(12) United States Patent
Asahara et al.

(10) Patent No.: US 9,019,481 B2
(45) Date of Patent: Apr. 28, 2015

(54) COLORED NOISE REDUCTION METHOD AND DEVICE FOR OPTICAL REMOTE AIRFLOW MEASUREMENT APPARATUS

(71) Applicant: Japan Aerospace Exploration Agency, Chofu-shi, Tokyo (JP)

(72) Inventors: Takashi Asahara, Chofu (JP); Hamaki Inokuchi, Chofu (JP)

(73) Assignee: Japan Aerospace Exploration Agency, Tokyo (JP)

( * ) Notice: Subject to any disclaimer, the term of this patent is extended or adjusted under 35 U.S.C. 154(b) by 99 days.

(21) Appl. No.: 13/644,573

(22) Filed: Oct. 4, 2012

(65) Prior Publication Data

US 2013/0088705 A1    Apr. 11, 2013

(30) Foreign Application Priority Data

Oct. 6, 2011  (JP) ................................. 2011-221741

(51) Int. Cl.
| G01P 3/36 | (2006.01) |
| G01S 17/95 | (2006.01) |
| G01S 17/58 | (2006.01) |
| G01S 7/487 | (2006.01) |

(52) U.S. Cl.
CPC ................. *G01S 17/95* (2013.01); *G01S 17/58* (2013.01); *G01S 7/4876* (2013.01)

(58) Field of Classification Search
CPC ........... G01P 5/26; G01P 3/366; G01S 17/58; G01S 17/95; G01S 17/50
USPC ............................... 356/28.5, 4.09, 35.5, 450
See application file for complete search history.

(56) References Cited

U.S. PATENT DOCUMENTS

| 5,955,985 | A  | * | 9/1999  | Kemkemian et al. | ......... 342/159 |
| 6,505,114 | B2 | * | 1/2003  | Luciani          | ......... 701/117 |
| 8,224,241 | B1 | * | 7/2012  | Gunasekara et al.| ......... 455/25  |
| 2003/0009268 | A1 |   | 1/2003  | Inokuchi         |                   |
| 2004/0264585 | A1 | * | 12/2004 | Borran et al.    | ......... 375/260 |
| 2007/0002013 | A1 | * | 1/2007  | Kong et al.      | ......... 345/157 |
| 2010/0033366 | A1 | * | 2/2010  | Shibata et al.   | ......... 342/70  |
| 2011/0066430 | A1 | * | 3/2011  | Hetherington     | ......... 704/228 |

FOREIGN PATENT DOCUMENTS

JP    2003-014845 A    1/2003

OTHER PUBLICATIONS

Inokuchi, Hamaki et al., "Development of an Onboard Doppler Lidar for Flight Safety", Journal of Aircraft, Jul.-Aug. 2009, pp. 1411-1415, vol. 46, No. 4.

* cited by examiner

*Primary Examiner* — Isam Alsomiri
*Assistant Examiner* — Samantha K Abraham
(74) *Attorney, Agent, or Firm* — Westerman, Hattori, Daniels & Adrian, LLP (57) ABSTRACT

An object of the present invention is to provide an optical remote airflow measurement apparatus with which even colored noise corresponding to an external environment of the apparatus can be reduced, thereby reducing measurement reliability deterioration and enabling long-distance measurement in a wide flying speed range. A colored noise reduction method according to the present invention includes: considering a signal strength of scattered light to be substantially non-existent in a remotest region and beyond; calculating a noise distribution by performing processing to average the signal strength in respective Doppler frequency components divided at intervals of a certain frequency in the remotest measurement region and beyond, and performing subtraction processing in each of the Doppler frequency components on all signal strength distributions of the measurement region, which are obtained by dividing the noise distribution at intervals of a certain distance.

13 Claims, 7 Drawing Sheets

COLORED NOISE ESTIMATION PROCEDURE

Fig. 3

AN ESTIMATED RESULT OF THE COLORED NOISE
TO THE AVERAGED NUMBER OF STAGES L

Fig. 4

THE ERROR SUM OF SQUARES TO THE AVERAGED NUMBER OF STAGES L
(STANDARD: L=32)

Fig. 5

AN EXAMPLE OF COLORED NOISE ESTIMATION/ REDUCTION

Fig. 6

AN EXAMPLE OF ESTIMATION/REDUCTION RESULTS

Fig. 7

AN EXAMPLE OF COLORED NOISE ESTIMATION/REDUCTION RESULTS

Fig. 8

AN EXAMPLE OF A DISTANCE CHARACTERISTIC OF THE S/N

Fig. 9

AN EXAMPLE OF A COLORED NOISE ESTIMATION REGION DETERMINATION

Fig. 10

AN EXAMPLE OF AIR TURBULENCE MEASUREMENT RESULTS

Fig. 11

AN EXAMPLE AN S/N DISTANCE CHARACTERISTIC

Fig. 12

A PROCEDURE FOR ESTTERMATING COLORED NOISE

Fig. 13

AN EXAMPLE OF A DISTANCE CHARACTERISTIC OF THE S/N

COLORED NOISE REDUCTION METHOD AND DEVICE FOR OPTICAL REMOTE AIRFLOW MEASUREMENT APPARATUS

BACKGROUND OF THE INVENTION

1. Field of the Invention

The present invention relates to an optical remote airflow measurement apparatus, and more particularly to an optical remote airflow measurement apparatus that measures a wind speed in a remote region of approximately several hundred meters up to several tens of kilometers away on the basis of a Doppler Effect by emitting laser light into the atmosphere and receiving scattered light generated from the laser light in the atmosphere.

2. Description of the Related Art

In recent years, air turbulence has gained attention as a principle cause of aircraft accidents, and therefore research and development is being undertaken into a Doppler LIDAR using laser light as an apparatus installed in an aircraft to detect air turbulence in advance (see H. Inokuchi, H. Tanaka, and T. Ando, "Development of an Onboard Doppler LIDAR for Flight Safety," Journal of Aircraft, Vol. 46, No. 4, pp. 1411-1415, July-August 2009, for example). Note that a LIDAR is a detection method employing light, and is an abbreviation for "Light Detection and Ranging". In a Doppler LIDAR, a wind speed is measured by receiving scattered laser light generated when an emitted light beam is scattered by minute aerosols floating in the atmosphere, and measuring frequency variation (wavelength variation) therein due to the Doppler Effect. A typical Doppler LIDAR measures a wind speed in a remote region on the basis of the Doppler Effect by emitting pulse form laser light and receiving scattered laser light generated from the laser light by the aerosols in the atmosphere. A Doppler LIDAR is already being put to practical use as an apparatus disposed on the ground to measure airflows in the sky thereabove.

The present inventor previously proposed a "Wind Disturbance Prediction System" in Japanese Patent Application Publication No. 2003-14845 (Japanese Patent Publication No. 3740525) "Wind Disturbance Prediction System", laid open on Jan. 15, 2003. An object of this invention was to provide a measurement system with which a three-dimensional wind disturbance can be measured, sudden warnings without prior notice, such as those of a conventional wind shear warning system, can be avoided, a determination as to whether or not a warning is reliable can be made in advance, wind disturbances can be detected such that countermeasures can be determined easily, few aerodynamic and structural effects are encountered when the system is installed in an aircraft, measurement can be performed at speeds of 20 to 30 m/s or less, at which measurement with a Pitot tube is impossible, measurement can be performed even when an airflow direction differs greatly from an airframe axis, and positional errors do not occur. This wind disturbance prediction system employs a method of installing a coherent laser anemometer having an inbuilt heterodyne receiver in an aircraft, emitting laser light while conically scanning the laser light, and measuring the wind speed of a remote three-dimensional airflow by receiving scattered light from a wind disturbance region in front of the airframe during flight. Further, taking into consideration the effect on the airframe of upper/lower wind and front/rear wind, information relating to the measured three-dimensional airflow is converted into upper/lower wind alone and displayed simply in two dimensions, whereby the wind disturbance is separated into and expressed as an air turbulence strength and an average wind. Furthermore, when the measured airflow information is transmitted to a pilot, a position of the disturbance is displayed using a time until the disturbance is encountered as a reference rather than a distance. In so doing, a part of a cylindrical optical system of a wind measurement LIDAR can be omitted, leading to an improvement in installation ability.

In this type of Doppler LIDAR, a technique for extracting useful signals from noise is important, and therefore, by reducing noise, measurement reliability can be improved, measurement can be performed even in a remote measurement region where a signal strength is low, and a maximum measurement distance can be increased. Typical conventional techniques involve smoothing noise by integrating measurement signals and superimposing the signals, but when a noise generation characteristic is irregular, or in other words in relation to colored noise, useful signals cannot be distinguished, and therefore the noise cannot be reduced.

Therefore, a method of measuring a unique noise pattern of a reception system in advance and subtracting the noise pattern from a measurement signal has been tested. However, this method cannot respond to variation in a condition of the colored noise during measurement, and an offset velocity cannot be varied during measurement. A measurement range of a Doppler frequency is limited, and therefore the offset velocity is a fixed velocity used in a function for subtracting a Doppler frequency corresponding to a flying speed from a measured frequency and aligning a result with a Doppler frequency range of wind speed information. The offset velocity conventionally takes a fixed value, and cannot therefore be used over a wide range of flying speeds.

SUMMARY OF THE INVENTION

The present invention has been designed to solve the problems described above, and an object thereof is to provide an optical remote airflow measurement apparatus with which even colored noise corresponding to an external environment of the apparatus can be reduced, thereby reducing measurement reliability deterioration and enabling long-distance measurement in a wide flying speed range.

To achieve this object, a colored noise reduction method for an optical remote airflow measurement apparatus according to the present invention is used in an optical remote airflow measurement apparatus that emits (transmits) laser light into the atmosphere as a transmission signal, receives scattered laser light generated from the laser light by aerosols in the atmosphere as a reception signal, and measures a wind speed of an airflow in a remote region on the basis of a Doppler shift amount of a frequency between the transmission signal and the reception signal, and includes: considering a signal strength of the scattered light to be substantially non-existent in a remotest region and beyond; calculating a noise distribution by performing processing to average the signal strength in respective Doppler frequency components divided at intervals of a certain frequency in the remotest measurement region and beyond, and performing subtraction processing in each of the Doppler frequency components on all signal strength distributions of the measurement region, which are obtained by dividing the noise distribution at intervals of a certain distance.

Further, in an aspect of the colored noise reduction method for an optical remote airflow measurement apparatus according to the present invention, a remote measurement region in which the signal strength of the scattered light is substantially non-existent is set by calculating a variation in the signal strength over a measurement distance and setting a region in which the variation is smaller than a set threshold as a colored noise measurement region.

In another aspect of the colored noise reduction method for an optical remote airflow measurement apparatus according to the present invention, the remote measurement region in which the signal strength of the scattered light is substantially non-existent is set farther than a normal measurement region as a dedicated region for measuring the colored noise instead of a remotest region of consecutive measurement regions.

In a further aspect of the colored noise reduction method for an optical remote airflow measurement apparatus according to the present invention, when the signal strength increases temporarily in a remote measurement region in response to meteorological conditions, colored noise measured immediately prior thereto is used as no-signal data.

Furthermore, an offset velocity can be modified during measurement by successively subtracting a Doppler frequency corresponding to a varying flying speed from the reception signal.

An optical remote airflow measurement apparatus according to the present invention is a device that emits (transmits) laser light into the atmosphere as a transmission signal, receives scattered laser light generated from the laser light by aerosols in the atmosphere as a reception signal, and measures a wind speed of an airflow in a remote region on the basis of a Doppler shift amount of a frequency between the transmission signal and the reception signal, and includes: means for calculating a noise distribution by performing processing to average a signal strength of the scattered light in respective Doppler frequency components divided at intervals of a certain frequency in a remotest measurement region and beyond where the signal strength of the scattered light may be considered substantially non-existent; and means for performing subtraction processing in each of the Doppler frequency components on a measured scattered light spectrum using the noise distribution.

The colored noise reduction method for an optical remote airflow measurement apparatus according to the present invention can prevent deterioration of a measurement precision in a remote region while simultaneously enlarging a measurement range, without employing a conventional method of increasing a laser transmission output or increasing a light receiving surface area, by estimating colored noise in and removing the colored noise from a measurement signal in a remote measurement region where the signal strength of the scattered light is substantially non-existent.

By employing the colored noise reduction method of the apparatus according to the present invention in an aircraft, a pilot can easily and reliably detect air turbulence ahead with sufficient prior notice and take appropriate measures to avoid an accident. Hence, the method may be applied favorably to the prevention of air turbulence related aircraft accidents, enabling a great improvement in air safety.

In a colored noise reduction method for an optical remote airflow measurement apparatus according to an embodiment of the present invention, the remote measurement region in which the signal strength of the scattered light is substantially non-existent can be set by calculating variation in the signal strength over the measurement distance and setting a region in which the variation is smaller than the set threshold as the colored noise measurement region. In so doing, colored noise can be estimated effectively through effective use of a region having only a noise component and substantially no signal component.

In a colored noise reduction method for an optical remote airflow measurement apparatus according to another embodiment of the present invention, the remote measurement region in which the signal strength of the scattered light is substantially non-existent can be set farther than a normal measurement region as a dedicated region for measuring colored noise instead of the remotest region of consecutive measurement regions, and therefore colored noise can be reduced reliably even when a range resolution is increased such that measurement is performed with an emphasis on near distances.

Moreover, in the colored noise reduction method for an optical remote airflow measurement apparatus according to the present invention, the offset velocity can be modified during measurement by successively subtracting the Doppler frequency corresponding to the varying flying speed from the reception signal, and therefore wind speeds can be measured precisely in an appropriate range corresponding to a wide range of flying speeds.

In an optical remote airflow measurement apparatus according to a further embodiment of the present invention, when the signal strength increases temporarily in a remote measurement region in response to meteorological conditions, colored noise measured immediately prior thereto is used as no-signal data. Therefore, it is possible to respond to various meteorological conditions.

The optical remote airflow measurement apparatus according to the present invention can prevent deterioration of the measurement precision in a remote region while simultaneously enlarging the measurement range, without employing a conventional method of increasing the laser transmission output or increasing the light receiving surface area, by estimating colored noise in and removing the colored noise from a measurement signal in a remote measurement region where scattered light has substantially no signal strength. Therefore, the optical remote airflow measurement apparatus can be configured as a power-efficient device that can be installed in an aircraft while realizing the effects described above in an actual aircraft.

DESCRIPTION OF THE PREFERRED EMBODIMENTS

The present invention will be described in further detail below using embodiments shown in the drawings. Note that the present invention is not limited to these embodiments.

Figure 1:
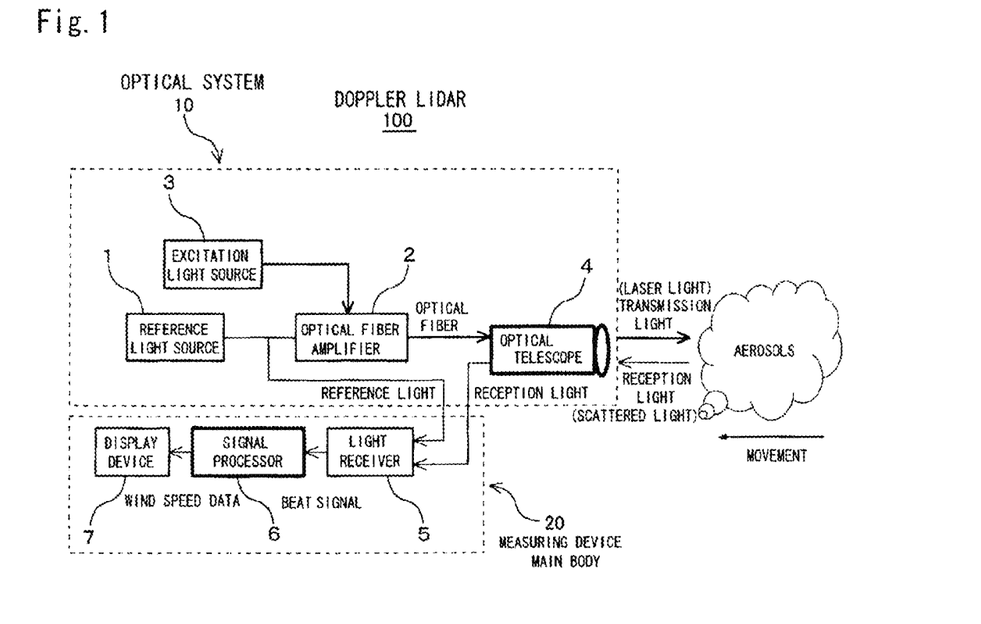
FIG. 1 is an illustrative block diagram showing a Doppler LIDAR serving as an optical remote airflow measurement apparatus according to the present invention.

FIG. 1 is a view showing a basic configuration of a Doppler LIDAR 100 serving as an optical remote airflow measurement apparatus according to the present invention. The Doppler LIDAR 100 is constituted by blocks including an optical system 10 that emits laser light into aerosols floating in the atmosphere as transmission light and receives scattered laser light from the aerosols as reception light, and a measuring device main body 20 that measures a wind speed on the basis of an amount of wavelength variation (a Doppler shift amount) between the reception light and the transmission light.

The optical system 10 is constituted by a reference light source 1 that emits weak laser light (reference light) as the transmission light, an optical fiber amplifier 2 that forms the transmission light by amplifying the weak laser light, an excitation light source 3 that generates laser light serving as pump light for exciting the optical fiber amplifier 2, and an optical telescope 4 that emits the transmission light into the distance and converges the scattered light from the distance. Note that near-infrared laser light of a 1.5 μm wavelength band, for example, may be used as the transmission light, and a highly efficient laser diode may be used as the excitation light source. Further, when installed in an aircraft, a fiber amplifier type Doppler LIDAR such as the Doppler LIDAR 100 described above exhibits advantages too numerous to be listed in their entirety here, such as small size, low weight, favorable power efficiency, little electromagnetic noise, high layout freedom, vibration resistance, dustproofing, ease of manufacture, and the ability to omit a liquid cooling mechanism.

The measuring device main body 20 is constituted by a light receiver 5 that receives the scattered laser light, synthesizes the received light with reference light, and outputs a beat signal, a signal processor 6 that processes the beat signal to measure a wind speed of an airflow in front of an airframe, and a display device 7 that displays a wind speed measurement result. As will be described below, the signal processor 6 prevents deterioration of a measurement precision occurring mainly at long distances where a reception strength decreases by performing colored noise estimation/reduction processing on a measurement signal.

As described above, the Doppler LIDAR 100 is a device that measures a wind speed in a remote region on the basis of the Doppler effect by emitting pulse-form laser light (transmission light) into the atmosphere and receiving scattered laser light (reception light) generated in the atmosphere from the laser light. A measurement region in a distance direction can be specified by dividing the reception light in time series, and as a result, wind speeds in a plurality of regions can be measured simultaneously.

In the Doppler LIDAR 100, rays of the transmission light are converged, and therefore little spatial propagation loss occurs. In the reception light, however, scattered rays are dispersed, and therefore the reception strength decreases substantially in inverse proportion to a square of the distance. During measurement in a remote region, therefore, a ratio of an internal noise component becomes prominent, leading to an increase in incorrect measurement values. Even at short distances, irregular atmospheric conditions may cause a temporary reduction in the reception strength.

Figure 2:
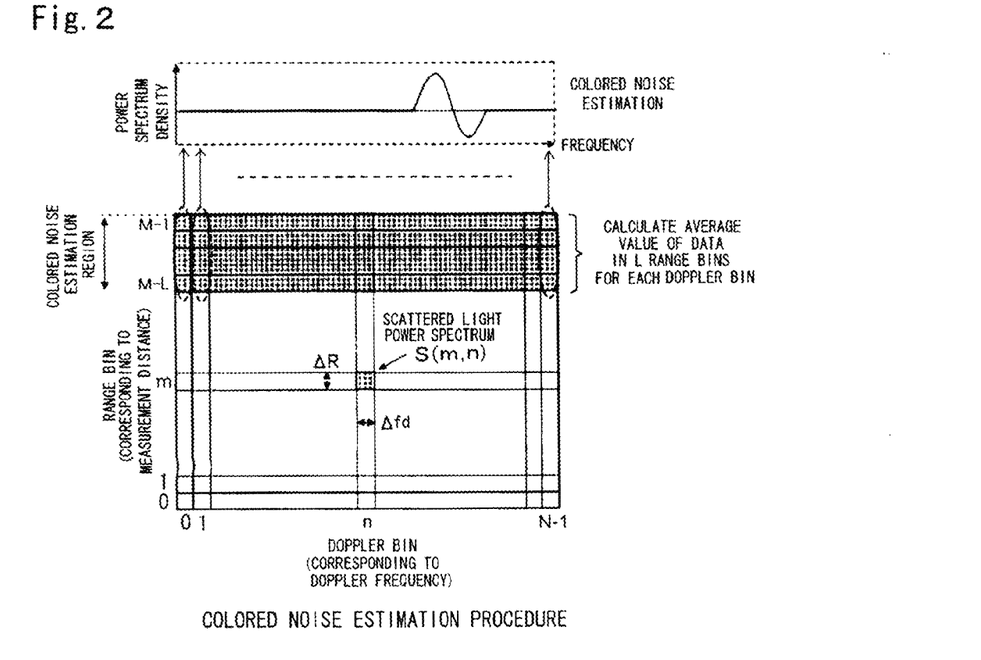
FIG. 2 is a view showing a procedure for estimating colored noise according to the present invention.

In the present invention, the signal processor 6 estimates colored noise in and removes the colored noise from a measurement signal in a remote measurement region in which scattered light has substantially no signal strength in relation to a power spectrum of the scattered light received by the Doppler LIDAR 100. As a result, deterioration of the measurement precision in a remote region is prevented while enlarging a measurement range. First, a measurement distance R and a Doppler frequency f are defined as $m\Delta R$ (m: range bin number; $\Delta R$: range bin length) and $n\Delta f_d$ (n: Doppler bin number; $\Delta f_d$: Doppler resolution), respectively. Next, as shown in FIG. 2, a noise power spectrum $N_{ave}(n)$ (n=0 to N−1) is calculated by performing processing to average scattered light power spectra of an averaged number of stages L for each Doppler bin number in relation to scattered light power spectra $S(m, n)$ (m=0 to M−1, n=0 to N−1) of the Doppler bin numbers n (=0 to N−1) in each range bin number m (=0 to M−1) within a range of range bin numbers m (=M−L to M−1) corresponding to a remotest measurement region. In other words, a following calculation is performed.

$$N_{ave}(n) = \frac{\sum_{m=M-L}^{M-1} S(m, n)}{L} \qquad (1)$$

Processing is then performed to calculate a power spectrum $S_{nr}(m, n)$ (m=0 to M−1, n=0 to N−1) in which noise such as colored noise has been reduced by subtracting the noise power spectrum $N_{ave}(n)$ (n=0 to N−1) calculated for each Doppler bin number in Equation (1) from the measured scattered light power spectrum $S(m, n)$. In other words, a following calculation is performed.

$$S_{nr}(m,n) = S(m,n) - N_{ave}(n) \qquad (2)$$

Next, the wind speed is calculated as follows from the power spectrum $S_{nr}(m, n)$ (m=0 to M−1, n=0 to N−1) in which noise such as colored noise has been reduced in Equation (2). First, a Doppler bin number $F_s(m)$ (m=0 to M−1) of an average Doppler frequency of each range bin number m is calculated by determining, in relation to the power spectrum $S_{nr}(m, n)$ (m=0 to M−1, n=0 to N−1) in which noise such as colored noise has been reduced in Equation (2), a primary moment within a left-right calculation range of a peak position $Pk(m)$ of the spectrum.

$$F_s(m) = \frac{\sum_{n=K_s}^{K_e} \{n \cdot S_{nr}(m, n)\}}{\sum_{n=K_s}^{K_e} S_{nr}(m, n)} \qquad (3)$$

Note that $GW_1$ is a parameter for determining a calculation processing range, where $K_s=P_k(m)-GW_1$, $K_e=P_k(m)+GW_1$.

An average wind speed v (m) is then calculated as follows from Equation (3).

$$v(m) = \frac{\lambda}{2} v_d(m) \quad (4)$$

$$\begin{cases} v_d(m) = \left(F_s(m) - \frac{N}{2}\right) \times \Delta f_d \\ \Delta f_d = \frac{f_s}{N_{FFT}} \end{cases}$$

Here, $\lambda$ is the wavelength of the laser light, $v_d$ (m) is the Doppler frequency in the range bin number m, $f_s$ is a sampling frequency of a reception signal, $N_{FFT}$ is a number of points ($N_{FFT}=2N$) of an FFT (fast Fourier transform).

Figure 3:
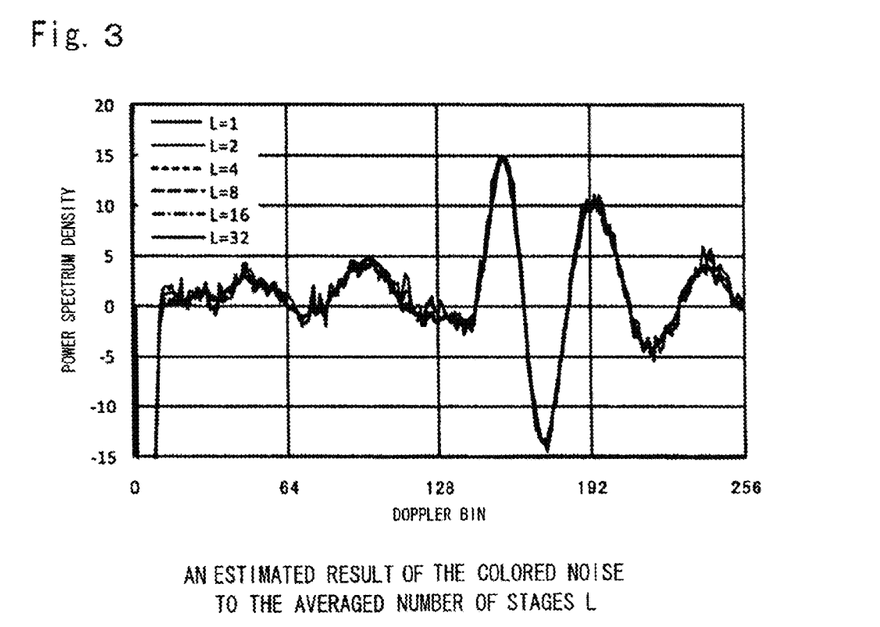
FIG. 3 is a view showing an example of colored noise estimation results relative to an averaged number of stages L, according to the present invention.
Figure 4:
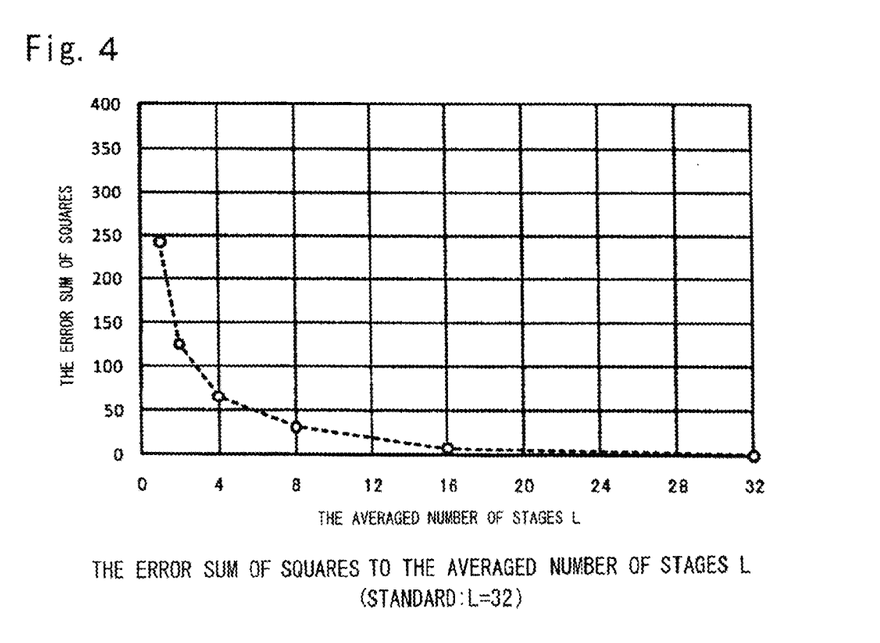
FIG. 4 is a view showing a relationship between the averaged number of stages L and an error sum of squares according to the present invention.

FIG. 3 shows an example of results obtained when colored noise estimation according to the present invention is performed on a scattered light power spectrum measured in an actual flight experiment using the Doppler LIDAR 100. In this evaluation, colored noise estimation results were evaluated in a case where the number of range bins was M=80, the number of Doppler bins was N=256, and the averaged number of stages L was varied. FIG. 4 is a view showing an evaluation of a relationship between the averaged number of stages L and an error sum of squares with respect to the colored noise estimation results of FIG. 3. As regards the error sum of squares, the colored noise estimation result at an averaged number of stages L=32 was set as a reference, and an error was evaluated in relation to this reference. It is evident from the evaluation results shown in FIGS. 3 and 4 that by increasing the averaged number of stages L, variation in the colored noise estimation result decreases, and that when the averaged number of stages is no less than approximately L=16, the value of the error sum of squares also decreases.

Figure 5:
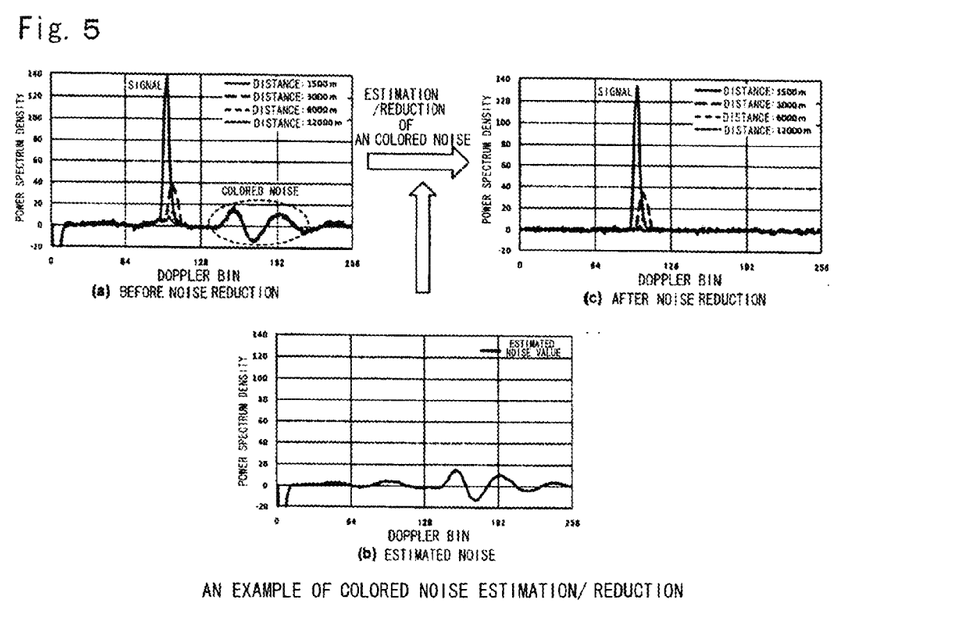
FIG. 5 is a view showing an example of colored noise estimation/reduction results according to the present invention.

Similarly to FIGS. 3 and 4, FIG. 5 shows an example of colored noise estimation/reduction results relating to a scattered light power spectrum measured in an actual flight experiment using the Doppler LIDAR 100. FIG. 5A shows the scattered light power spectrum prior to colored noise reduction. FIG. 5B shows a colored noise power spectrum estimated according to the present invention. FIG. 5C shows a scattered light power spectrum following colored noise reduction using the colored noise power spectrum estimated according to the present invention. Note that colored noise estimation was performed with the number of range bins set at M=80, the number of Doppler bins set at N=256, and the averaged number of stages set at L=16. In FIG. 5A, colored noise believed to have been generated as a result of the external environment of the apparatus rather than a signal component is measured in the scattered light power spectrum measured by the Doppler LIDAR 100. FIG. 5C shows a result obtained by estimating the colored noise in and removing the colored noise from the measured scattered light power spectrum in accordance with the present invention. It is evident from this drawing that it is possible to remove only colored noise which impairs measurement effectively with substantially no effect on the signal component.

In other words, the optical remote airflow measurement apparatus according to the present invention can be configured as a power-efficient device that can be installed in an aircraft, with which it is possible to prevent deterioration of the measurement precision in a remote region while simultaneously enlarging a measurement range, without employing a conventional method of increasing a laser transmission output or increasing a light receiving surface area, by estimating colored noise in and removing the colored noise from a measurement signal in a remote measurement region where scattered light has substantially no signal strength.

Further, as shown in FIG. 2, the optical remote airflow measurement apparatus according to the present invention employs a method of estimating a noise distribution in each received scattered light power spectrum and subtracting the estimated noise distribution from the measurement signal. Therefore, the offset velocity can be modified during measurement, making it possible to respond to a wide range of flying speeds. Note that when temporal variation in the noise distribution is small, a calculation amount can be reduced by estimating the noise distribution at certain fixed intervals rather than for each received scattered light power spectrum.

Furthermore, with the optical remote airflow measurement apparatus according to the present invention, the remote measurement region where scattered light has substantially no signal strength can be set by calculating variation in the signal strength over the measurement distance and setting a region in which the variation is smaller than a set threshold as a colored noise measurement region. In so doing, colored noise can be estimated effectively using regions having only a noise component and substantially no signal component. Further, the remote measurement region where scattered light has substantially no signal strength can be set farther than a normal measurement region as a dedicated region for measuring colored noise instead of the remotest region of consecutive measurement regions, and therefore colored noise can be estimated and removed reliably even when the range resolution is increased such that measurement is performed with an emphasis on near distances. Moreover, when the signal strength increases temporarily in a remote measurement region in response to meteorological conditions, colored noise measured immediately prior to the temporary increase can be used as no-signal data, and therefore the apparatus can respond to various meteorological conditions.

(First Embodiment)

Figure 6:
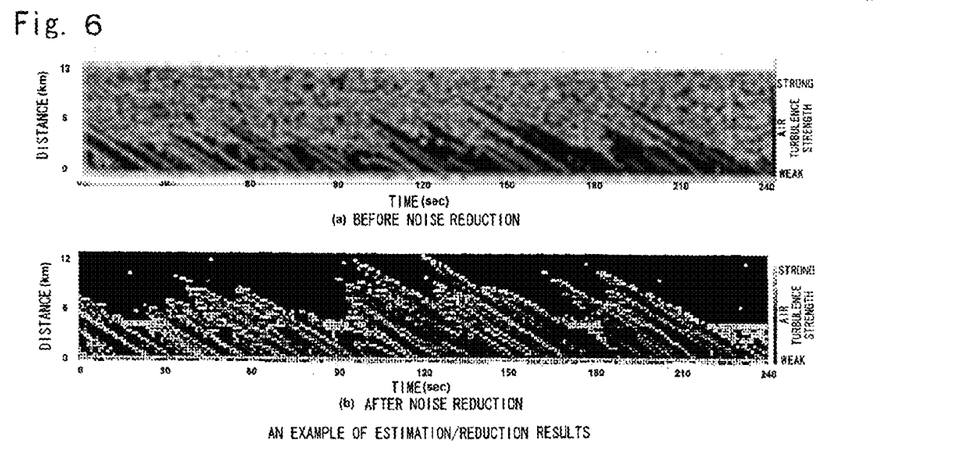
FIG. 6 is a view showing an example of air turbulence measurement results according to a first embodiment of the present invention.

FIG. 6 is a view showing an example of an air turbulence measurement result according to a first embodiment of the present invention. Data obtained in an actual flight experiment are used, and FIG. 6A shows an air turbulence measurement result measured using the Doppler LIDAR 100 prior to noise reduction, while FIG. 6B shows an air turbulence measurement result following noise reduction according to the present invention. The averaged number of stages used to estimate the colored noise is set at L=16. In FIGS. 6A and 6B, the airframe travels at a speed of approximately 220 m/s in a vertical axis upward direction, and a vertical length (a range bin length $\Delta R$) of one small square is 300 m. A vertical single series of data can be measured simultaneously over one second, and the data are arranged horizontally in time series. In other words, the scattered light power spectrum S(m, n) (m=0 to M−1, n=0 to N−1) shown in FIG. 2 is measured at one second intervals, the wind speed is calculated from Equations (1) to (4) using the measured scattered light power spectrum, and an air turbulence strength calculated from variation in the wind speed corresponds to a vertical single series of data. Note that in this measurement operation, the range bin number is M=80 and the Doppler bin number is N=256, and measurement results of range bin numbers 0 to 40 are shown. Further, the darkness of the color in each square indicates a magnitude of the air turbulence strength calculated from the wind speed variation such that the value of the air turbulence strength increases steadily toward white. It should be noted, however, that when the reception strength of the scattered light power spectrum is low, the reliability of the measurement result decreases, and therefore cases in which a signal power to noise power ratio (S/N) representing a quality of the reception signal is lower than 7 dB are displayed in black.

From FIG. 6, it is possible to confirm the existence of occasional regions having a varying wind speed during flight and the manner in which these regions approach the airframe over time. The S/N ratio normally decreases as the measurement distance increases, and therefore black displays in which the reliability of the measurement result is determined to be low increase in remote measurement regions. In the pre-noise reduction evaluation results shown in FIG. 6A, however, the colored noise is determined as a signal, and since the level thereof is at least 7 dB, the air turbulence strength is measured erroneously numerous times. In the post-noise reduction evaluation results shown in FIG. 6B, on the other hand, colored noise causing measurement errors has been removed effectively using the colored noise estimation/reduction method according to the present invention, and therefore regions in which the reliability of the measurement result in remote measurement regions is low are displayed in black. As a result, only reliable, correctly measured measurement results are displayed, and therefore deterioration of the reliability of the measurement results due to colored noise is reduced. Note that during measurement in very near regions, transmission signal wraparound occurs in the apparatus interior, and therefore correct measurement results are not obtained.

Figure 7:
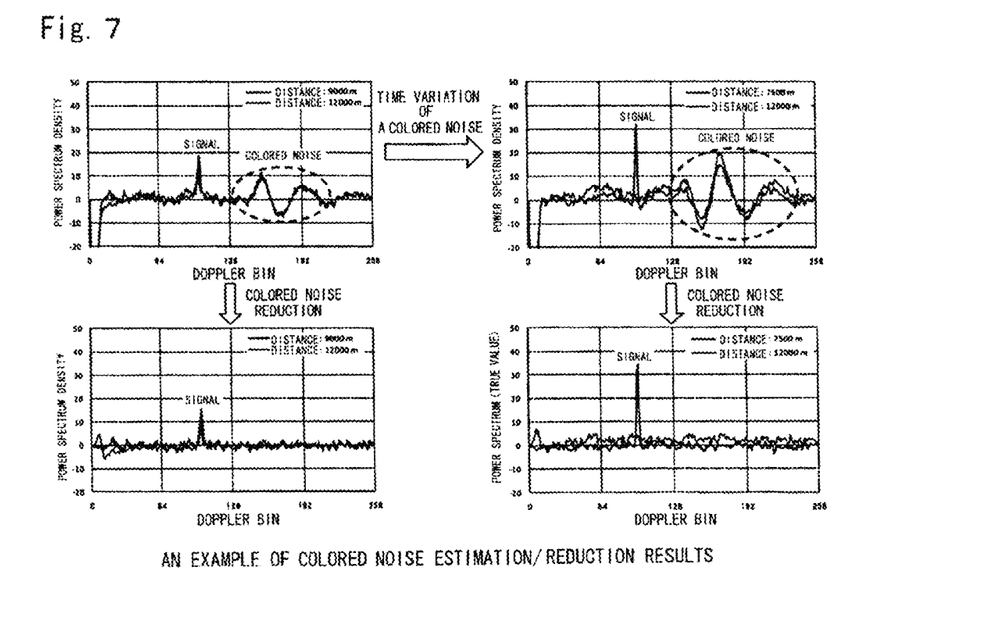
FIG. 7 is a view showing an example of estimation/reduction results relating to colored noise that varies over time, according to the first embodiment of the present invention.

FIG. 7 is a view showing an example of estimation/reduction results relating to colored noise that varies over time, according to the first embodiment. Data obtained in an actual flight experiment are used, and FIG. 7 shows the manner in which the shape of the colored noise varies over time. In this case, the colored noise cannot be removed effectively using a conventional method of measuring the unique noise pattern of the reception system in advance and subtracting the noise pattern from the measurement signal, but according to the present invention, colored noise estimation/reduction is performed on each received scattered light power spectrum, and therefore even colored noise that varies over time can be removed effectively.

Figure 8:
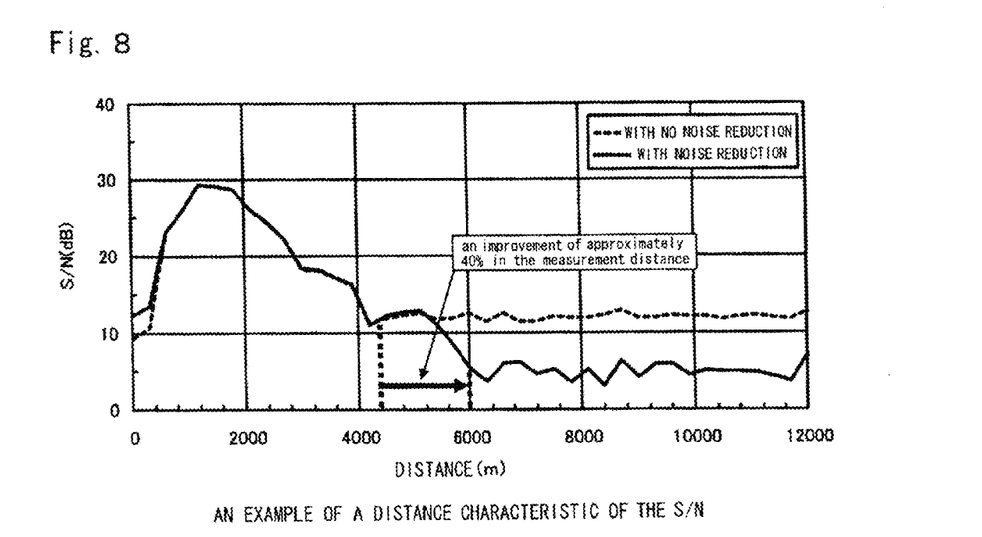
FIG. 8 is a view showing an example of an S/N distance characteristic according to the first embodiment of the present invention.

FIG. 8 is a view showing an example of a distance characteristic of the S/N ratio according to the first embodiment of the present invention. Likewise here, data obtained in an actual flight experiment are used, and FIG. 8 shows a distance characteristic of the reception signal relative to the S/N ratio at a certain time. It is evident from FIG. 8 that by performing colored noise estimation/reduction according to the present invention, a noise level in a remote measurement region can be reduced, leading to an improvement of approximately 40% in the measurement distance, and therefore the effect of improving the measurement distance according to the present invention can be confirmed.

(Second Embodiment)

In the colored noise estimation/reduction according to the first embodiment of the present invention, as shown in FIG. 2, colored noise estimation was performed using a fixed range of range bin numbers m (=M−L to M−1) having the averaged number of stages L as the colored noise estimation range. However, the measurement distance varies according to an aerosol density of the atmosphere and so on, and therefore a range of the remote measurement region in which the signal strength of the scattered light is substantially non-existent also varies. When the region becomes smaller, a region in which the scattered light possesses signal strength maybe included in the colored noise estimation range so as to have an adverse effect on the signal component. Therefore, a region in which the scattered light is assumed to possess substantially no signal strength, i.e. a region assumed to include only noise, is estimated, and colored noise estimation/reduction is performed in the estimated range.

Figure 9:
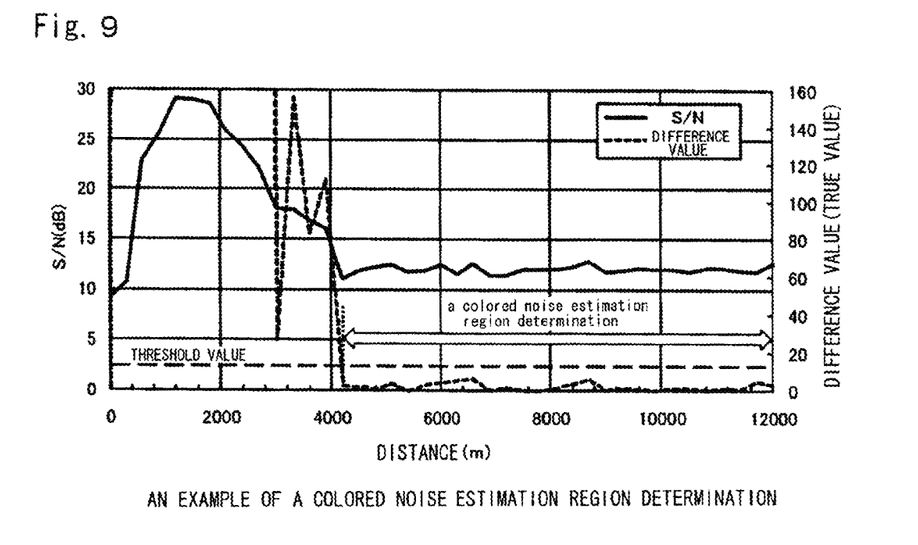
FIG. 9 is a view showing an example of a colored noise estimation region determination according to a second embodiment of the present invention.

FIG. 9 is a view showing an example of a colored noise estimation region determination according to the second embodiment of the present invention. In FIG. 9, S/N variation over the measurement distance is calculated in relation to the S/N ratio of the received scattered light power spectrum, a certain threshold is set in relation to the variation, and when the variation is equal to or smaller than the set threshold, a region including only a noise component, i.e. a region in which a signal component is substantially non-existent, is determined. This region is then set as the colored noise estimation region. More specifically, first, variation D(m) in a reception strength is calculated as follows.

$$D(m) = S(m - \Delta, P_k(m - \Delta)) - S(m, P_k(m)) \quad (5)$$

Note that $\Delta$ is a range bin number interval at which the variation is calculated.

The variation D(m) is calculated successively while setting the range bin number m at M−1, M−2, ..., and a range bin number obtained by adding a noise position offset amount $N_{ofst}$ to a range bin number X at a point where the variation exceeds a set threshold $D_{th}$, $D_{ont}$, times consecutively is set at a starting range bin for colored noise estimation. Note that a signal component may be included in the noise position offset amount $N_{ofst}$ at a variation point in the reception level when noise reduction has not been performed, and therefore the colored noise estimation starting position is corrected such that the signal component is not removed. In other words, a range bin range in which colored noise estimation is performed is set at $(X + N_{ofst})$ to M−1. The noise power spectrum N, (n) (n=0 to N−1) in this case is calculated as follows.

$$N_{ave}(n) = \frac{\sum_{m=X+N_{ofst}}^{M-1} S(m, n)}{M - (X + N_{ofst})} \quad (6)$$

Using Equation (6), the wind speed is calculated through similar procedures to those shown in Equations (2) to (4).

Figure 10:
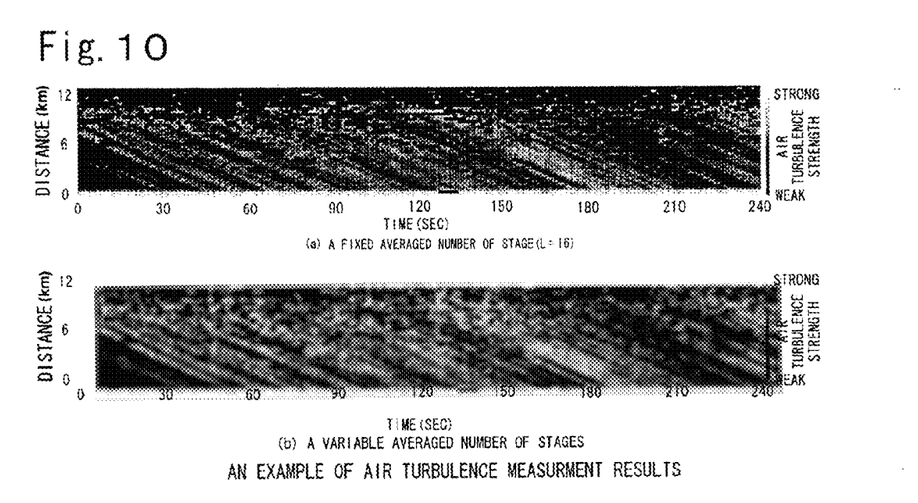
FIG. 10 is a view showing an example of air turbulence measurement results according to the second embodiment of the present invention.
Figure 11:
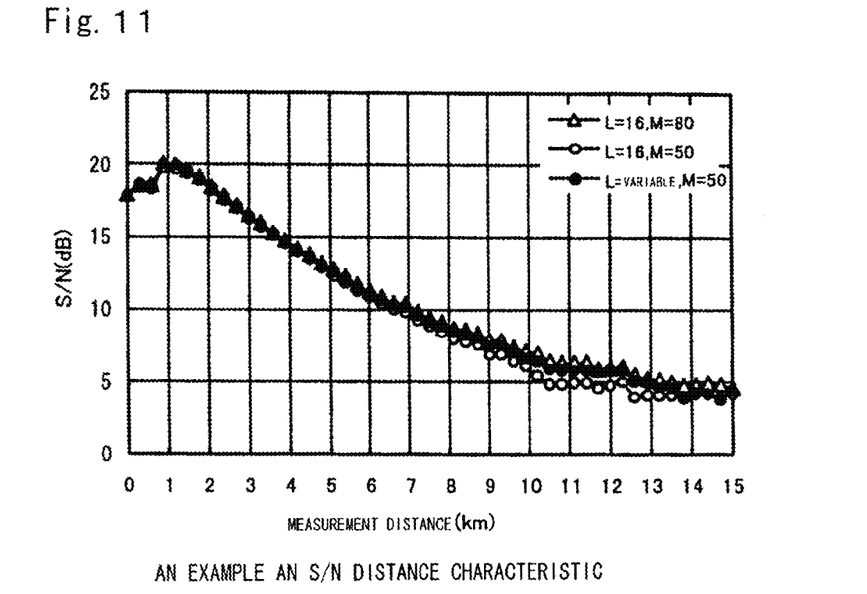
FIG. 11 is a view showing an example of an S/N distance characteristic according to the second embodiment of the present invention.

FIG. 10 is a view showing an example of air turbulence measurement results according to the second embodiment of the present invention. Here, data obtained in an actual flight experiment are used, and FIG. 10A shows the air turbulence strength in a case where colored noise estimation/reduction is performed on all range bin numbers M=50 with a fixed averaged number of stages (L=16), while FIG. 10B shows the air turbulence strength in a case where colored noise estimation/reduction is performed likewise on all range bin numbers M=50 but with a variable averaged number of stages. In FIGS. 10A and 10B, the airframe travels at a speed of approximately 140 m/s in the vertical axis upward direction, and the vertical length (the range bin length $\Delta R$) of one small square is 300 m. A vertical single series of data can be measured simultaneously over one second, and the data are arranged horizontally in time series. In other words, the scattered light power spectrum S(m, n) (m=0 to M−1, n=0 to N−1) shown in FIG. 2 is measured at one second intervals, the wind speed is calculated from Equations (1) to (4) using the measured scattered light power spectrum, and the air turbulence strength calculated from variation in the wind speed corresponds to a vertical single series of data. Note that in this measurement operation, the range bin number is M=80 and the Doppler bin number is N=256, and measurement results of range bin numbers 0 to 40 are shown. Further, the darkness of the color in each square indicates the air turbulence strength calculated from the wind speed variation such that the value of the air turbulence strength increases steadily toward white. It should be noted, however, that when the reception strength of the scattered light power spectrum is low, the reliability of the measurement result decreases, and therefore cases in which the signal power to noise power ratio (S/N) representing the quality of the reception signal is lower than 6 dB are displayed in black. Further, FIG. 11 shows a distance characteristic relative to an average value of the S/N ratio over four minutes following colored noise reduction, measured at one second intervals at each range bin length at 300 m in the data shown in FIG. 10. Note that in these evaluations, an effect of averaged stage number variation processing is confirmed, and therefore the region in which the signal strength of the scattered light is substantially non-existent is reduced over all range bin numbers M=50.

It can be seen from FIG. 10 that when the colored noise estimation range is fixed at (L=16) in relation to all range bin numbers M=50, the signal component is removed as well as the colored noise in the vicinity of a measurement distance exceeding 10 km, leading to a reduction in the measurement distance. When the colored noise estimation range is made variable, on the other hand, a measurement distance exceeding 10 km can be confirmed in the vicinity of 90 to 150 seconds, for example. Further, it is evident from FIG. 11 that with the characteristic of L=16 to M=50, the S/N ratio decreases by approximately 1 dB in the vicinity of a measurement distance of 10 to 13 km in comparison with the characteristic of L=16 to all range bin numbers M=80, where the signal component is not removed and the colored noise estimation error is small. However, with a characteristic where L is variable, little S/N reduction is observed, and therefore the decrease in the measurement distance due to reduction of the signal component is reduced.

By determining a region having substantially no signal component, i.e. including only a noise component, and using this region effectively to perform colored noise estimation, colored noise can be removed effectively.

(Third Embodiment)

Figure 12:
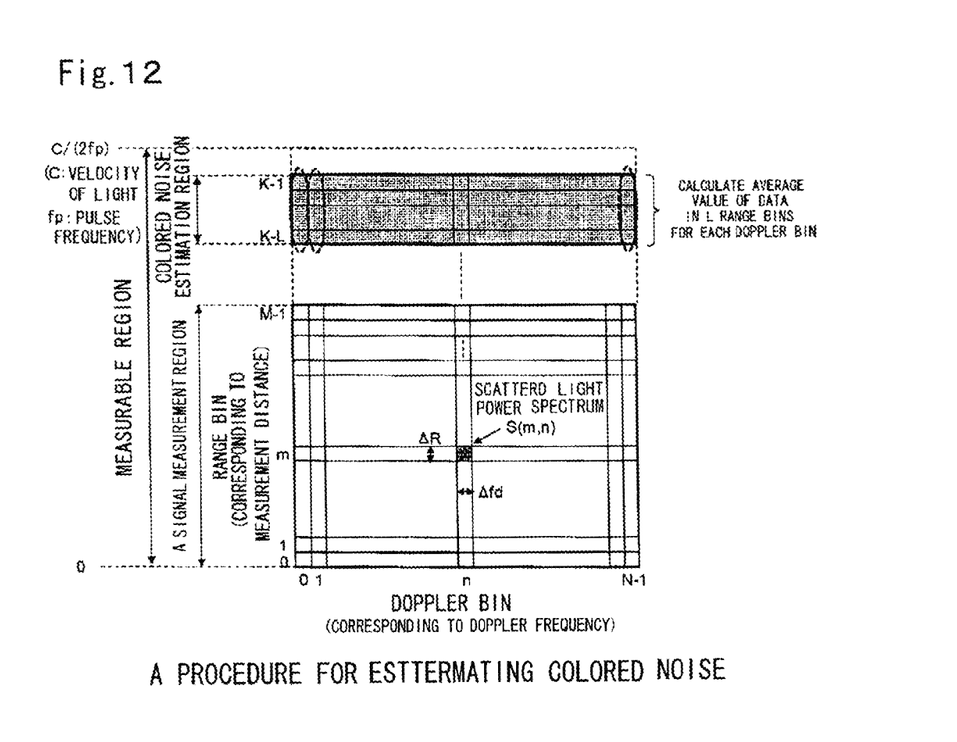
FIG. 12 is a view showing a procedure for estimating colored noise according to a third embodiment of the present invention.

FIG. 12 is a view showing procedures for estimating colored noise according to a third embodiment of the present invention. In a device currently under development by JAXA, a repetition frequency fp of an emitted pulse-form laser beam is 4 kHz, and a pulse width is 500 to 950 ns. Hence in a measurement region having a distance of no more than approximately 37 km ($\simeq c/(2 fp)$, c: light speed), a following laser pulse is not emitted until an initial laser pulse finishes reciprocating, and therefore reception light generated by the following laser pulse can be differentiated from that of the initial laser pulse. In other words, when a signal measurement region is set at 0 to (M−1) ΔR in a measurable region of 0 to 37 km, colored noise estimation can be performed using a region of (K−L) ΔR to (K−1) ΔR, from within the remaining region of M ΔR to 37 km, as the colored noise estimation region.

(Fourth Embodiment)

Figure 13:
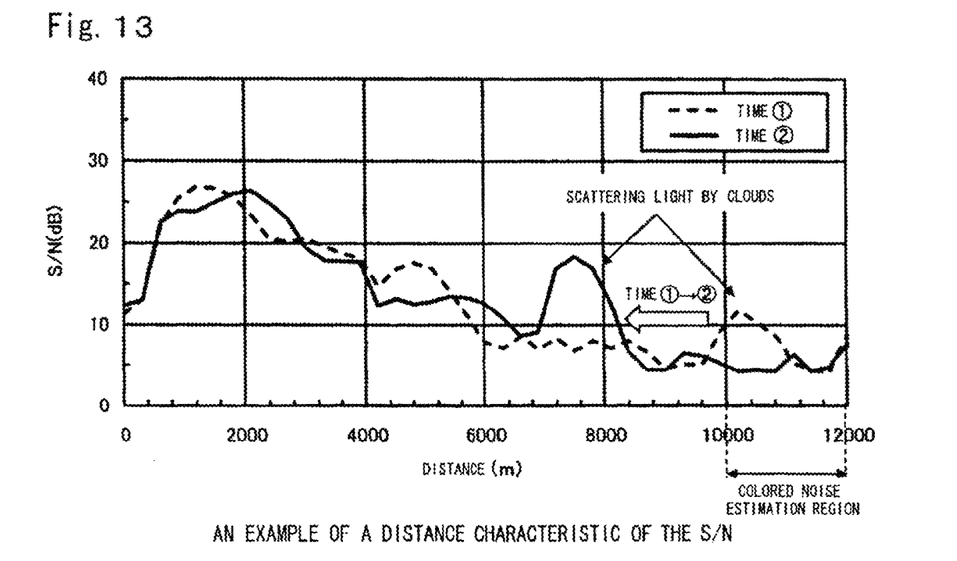
FIG. 13 is a view showing an example of an S/N distance characteristic according to a fourth embodiment of the present invention.

FIG. 13 is a view showing an example of the distance characteristic of the S/N ratio according to a fourth embodiment of the present invention. As shown in FIG. 13, due to clouds or the like, the signal strength in a remote region may increase temporarily, but in this case, the signal strength beyond the remote region decreases dramatically, and therefore no-signal data can be re-obtained in an extremely short time. For example, as shown at a time 1) in FIG. 13, when the signal strength increases temporarily in the colored noise estimation region due to the effect of a cloud or the like, the colored noise reduction processing is performed using the colored noise estimation result obtained immediately prior to the temporary increase in signal strength. As shown at a time 2), when the cloud approaches the airframe due to movement of the aircraft or the like such that the colored noise estimation region becomes distant from the cloud, the signal strength decreases dramatically, and therefore no-signal data can be re-obtained in an extremely short time. Even under unusual conditions in which the signal strength increases continuously, a signal having sufficient strength can be obtained in the measurement region without the need for noise reduction.

The optical remote airflow measurement apparatus according to the present invention may be applied favorably as danger avoiding means or danger predicting means for detecting turbulence in front of an aircraft. The optical remote airflow measurement apparatus according to the present invention may also be applied to a Doppler LIDAR that is disposed on the ground to measure airflows in the sky thereabove.

What is claimed is:

1. A colored noise reduction method for an optical remote airflow measurement apparatus that emits laser light into the atmosphere as a transmission signal, receives scattered laser light generated from said laser light by aerosols in the atmosphere as a reception signal, and measures a wind speed of an airflow in a remote region on the basis of a Doppler shift amount of a frequency between said transmission signal and said reception signal, said method comprising:

estimating the colored noise by calculating a noise distribution by averaging value of data corresponding to a received signal strength of the scattered laser light in L range bins for each Doppler bin, the received signal strength in respective Doppler bins having Doppler frequency components divided at intervals of a certain frequency in a remotest measurement region where signal strength due to scattered light is substantially non-existent, and reducing the colored noise by subtracting Doppler frequency components of the noise distribution from each of said Doppler frequency components on all signal strength distributions in said remotest measurement region.

2. The colored noise reduction method for an optical remote airflow measurement apparatus according to claim 1, wherein said remote measurement region in which said signal strength of said scattered light is substantially non-existent is set by calculating a variation in said signal strength over a measurement distance and setting a region in which said variation is smaller than a set threshold as a colored noise measurement region.

3. The colored noise reduction method for an optical remote airflow measurement apparatus according to claim 2, wherein, when said signal strength increases temporarily in a remote measurement region in response to meteorological conditions, colored noise measured immediately prior thereto is used as data, in which the signal strength of the scattered light is substantially non-existent.

4. The colored noise reduction method for an optical remote airflow measurement apparatus according to claim 3, wherein an offset velocity can be modified during measurement by successively subtracting a Doppler frequency corresponding to a varying flying speed from said reception signal.

5. The colored noise reduction method for an optical remote airflow measurement apparatus according to claim 2, wherein an offset velocity can be modified during measurement by successively subtracting a Doppler frequency corresponding to a varying flying speed from said reception signal.

6. The colored noise reduction method for an optical remote airflow measurement apparatus according to claim 1, wherein said remote measurement region in which said signal strength of said scattered light is substantially non-existent is set farther than a normal measurement region as a dedicated region for measuring said colored noise instead of a remotest region of consecutive measurement regions.

7. The colored noise reduction method for an optical remote airflow measurement apparatus according to claim 6, wherein, when said signal strength increases temporarily in a remote measurement region in response to meteorological conditions, colored noise measured immediately prior thereto is used as data, in which the signal strength of the scattered light is substantially non-existent.

8. The colored noise reduction method for an optical remote airflow measurement apparatus according to claim 7, wherein an offset velocity can be modified during measurement by successively subtracting a Doppler frequency corresponding to a varying flying speed from said reception signal.

9. The colored noise reduction method for an optical remote airflow measurement apparatus according to claim 6, wherein an offset velocity can be modified during measurement by successively subtracting a Doppler frequency corresponding to a varying flying speed from said reception signal.

10. The colored noise reduction method for an optical remote airflow measurement apparatus according to claim 1, wherein, when said signal strength increases temporarily in a remote measurement region in response to meteorological conditions, colored noise measured immediately prior thereto is used as data, in which the signal strength of the scattered light is substantially non-existent.

11. The colored noise reduction method for an optical remote airflow measurement apparatus according to claim 10, wherein an offset velocity can be modified during measurement by successively subtracting a Doppler frequency corresponding to a varying flying speed from said reception signal.

12. The colored noise reduction method for an optical remote airflow measurement apparatus according to claim 1, wherein an offset velocity can be modified during measurement by successively subtracting a Doppler frequency corresponding to a varying flying speed from said reception signal.

13. An optical remote airflow measurement apparatus for implementing the colored noise reduction method according to claim 1, in which the optical remote airflow measurement apparatus emits laser light into the atmosphere as a transmission signal, receives scattered laser light generated from said laser light by aerosols in the atmosphere as a reception signal, and measures a wind speed of an airflow in a remote region on the basis of a Doppler shift amount of a frequency between said transmission signal and said reception signal, said optical remote airflow measurement apparatus comprising:

means for calculating a noise distribution by performing processing to average a signal strength of said scattered light in respective Doppler frequency components divided at intervals of a certain frequency in a remotest signal measurement region and beyond where said signal strength of said scattered light may be considered substantially non-existent; and means for performing subtraction processing in each of said Doppler frequency components on a measured scattered light spectrum by using said noise distribution.

\* \* \* \* \*